Patented Feb. 24, 1925.

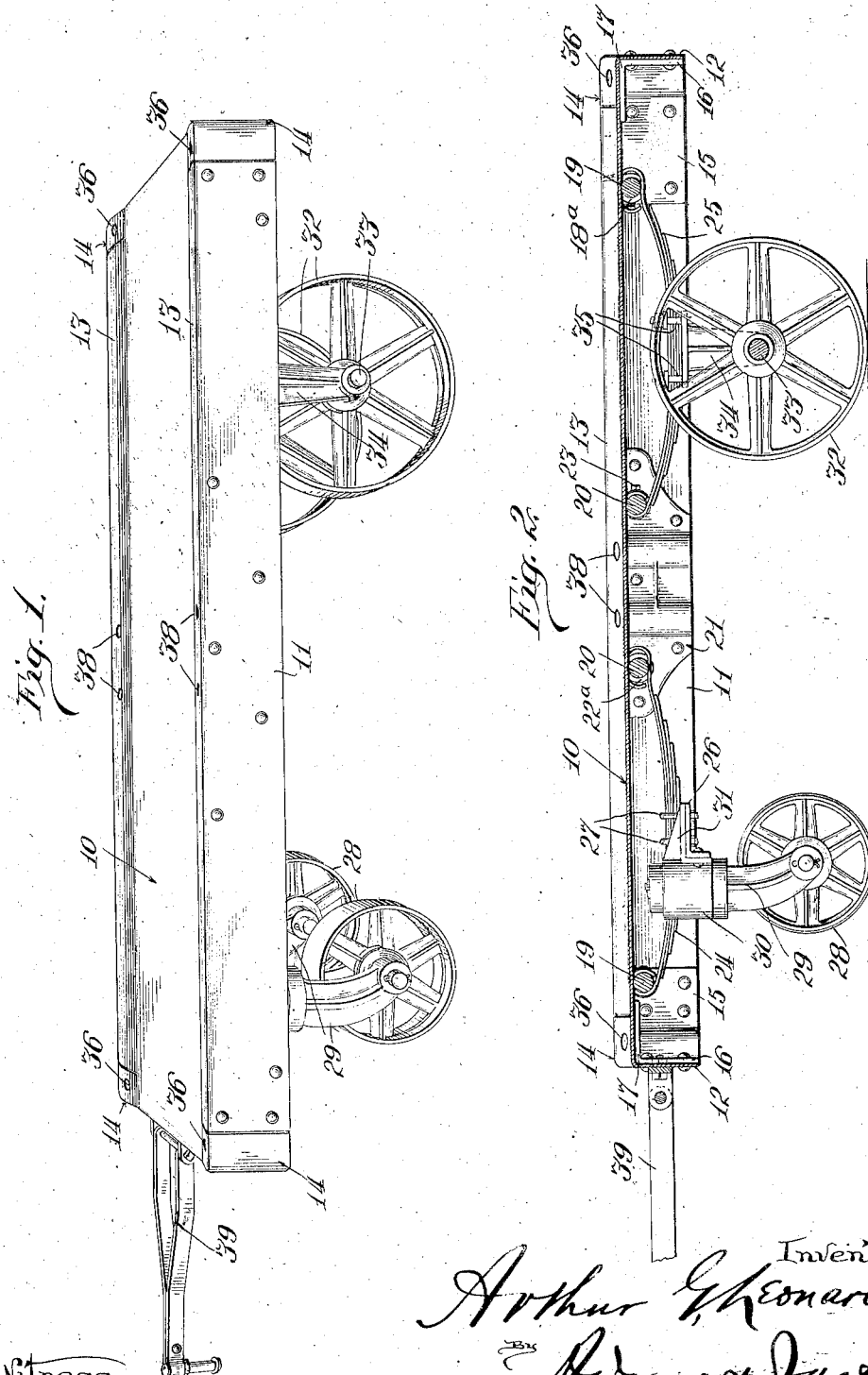
Feb. 24, 1925.
A. G. LEONARD, JR
TRUCK
Filed June 20, 1921
1,527,419
2 Sheets-Sheet 1

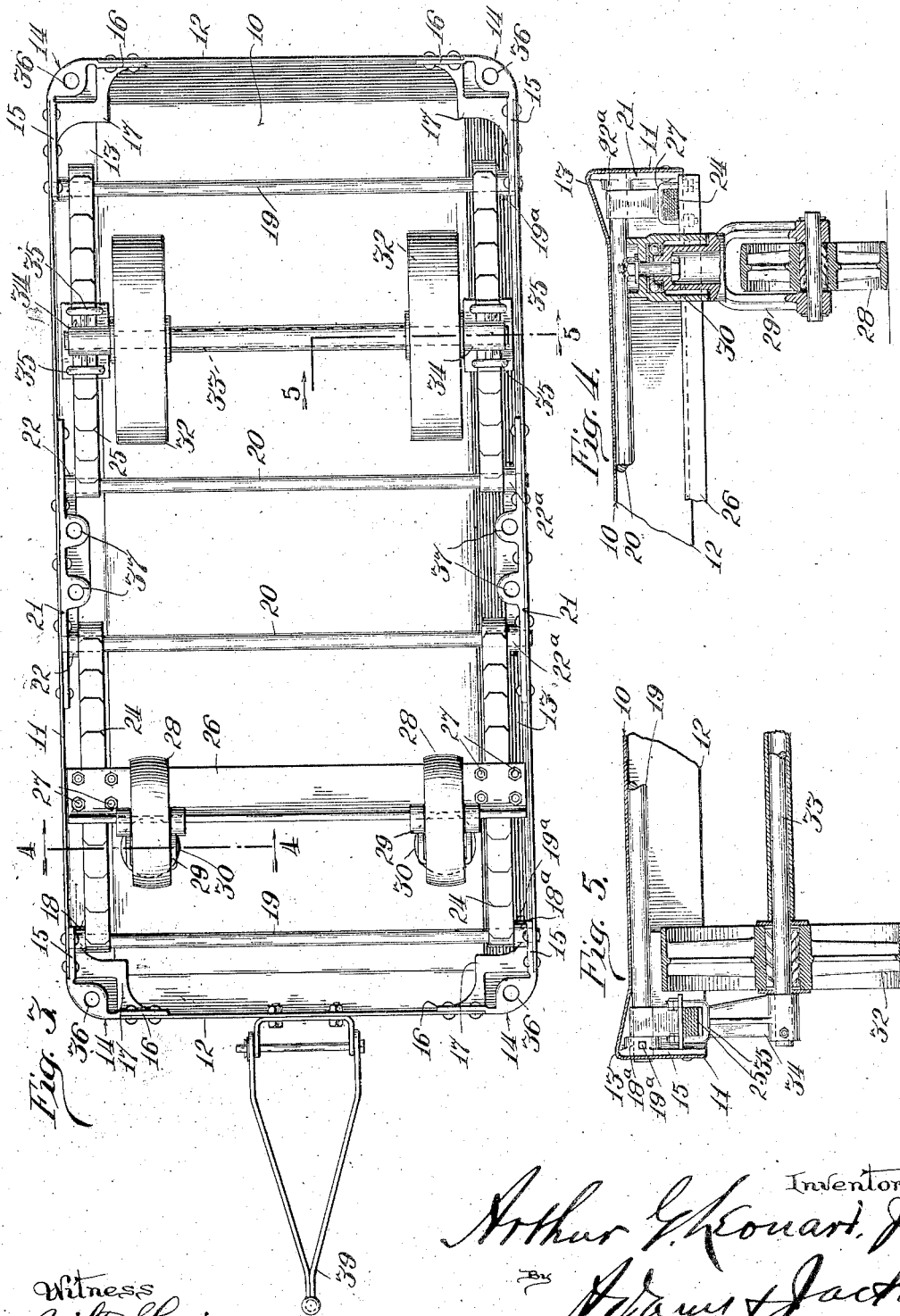

1,527,419

UNITED STATES PATENT OFFICE.

ARTHUR G. LEONARD, JR., OF CHICAGO, ILLINOIS, ASSIGNOR TO THE MERCURY MANUFACTURING COMPANY, OF CHICAGO, ILLINOIS, A CORPORATION OF ILLINOIS.

TRUCK.

Application filed June 20, 1921. Serial No. 479,076.

To all whom it may concern:

Be it known that I, ARTHUR G. LEONARD, Jr., a citizen of the United States, and a resident of Chicago, in the county of Cook and State of Illinois, have invented certain new and useful Improvements in Trucks, of which the following is a specification, reference being had to the accompanying drawings.

This invention relates to improvements in trucks and more particularly to that type of truck employed for the moving of articles in and around warehouses, railroad stations, freight depots, etc., and ordinarily drawn by small tractors. The invention has for its objects to provide a novel construction of platform or bed for the truck; to provide improved means for affording support to such platform or bed, and so securing such supporting means that they can be readily removed to allow of the removal of the platform or bed for purposes of replacement or repairs; to provide improved means for securing in place the several wheels of the truck and also the springs that are interposed between such wheels and the platform or bed; and to improve generally the construction of devices of the type specified. These objects I attain by the construction and arrangement of parts as shown in the drawings and hereinafter particularly described. That which I believe to be new will be set forth in the claims.

In the drawings,—

Fig. 1 is a perspective view of a truck in which my improvements are embodied;

Fig. 2 is a longitudinal central section of the truck;

Fig. 3 is an under side view of the truck; and

Figs. 4 and 5 are details being sections taken substantially on the lines 4—4 and 5—5, respectively, of Fig. 3.

Referring to the drawings,—10 indicates the platform or bed of the truck, which, as shown, is formed of a heavy plate of metal, and, by reason of the shape into which it is bent, constitutes not only the platform or bed proper, but the frame. In other words, by constructing the part 10 in the manner about to be described, it is not necessary to provide the ordinary end and side bars as in the usual truck construction. The side portions of this member 10 are bent to form downwardly-extending vertical side bars 11, and the end portions are likewise turned to form end bars 12. Adjacent to each of the parts 11 the metal sheet is bent so as to form raised portions or ribs 13 that extend along each side of the truck, as clearly shown in Fig. 1. These raised portions or ribs which, as shown, are inclined from the sides towards the longitudinal central portion of the platform, act not only to stiffen the platform as a whole, but serve two other purposes,—one being to provide ledges that will tend to prevent articles on the platform from sliding off, and the other, and possibly the most important, being to provide spaces for the reception of other parts that will be hereinafter pointed out. At each of its corners the plate that forms the described combined platform and frame is cut away for the reception of corner blocks 14, which are preferably steel castings. Each corner block is shown as of a height substantially equal to the width of the down-turned members 11 and 12, and integral with each block are two vertical wall portions 15 and 16 which lie respectively against the inner faces of the side and end platform members 11 and 12, and are riveted to such last-named members, as clearly shown in Fig. 3. Formed with each corner block 14 is a horizontal piece 17 lying flush with the upper edges of the wall portions 15 and 16, and adapted to have rest thereon, as best shown in Fig. 2, the horizontal portion of the platform 10, and give support thereto, although it is to be understood that other means, to be described hereinafter, are chiefly relied upon as affording the required support for the platform. The outer surfaces of the several corner blocks 14 are preferably rounded, as shown, and the upper surface of each will be preferably shaped to conform to the marginal incline 13 of the platform.

Near the upper edge of each of the wall members 15, and projecting inwardly therefrom, is a boss. The bosses at one side of the truck are indicated by 18, and those at the opposite side by 18$^a$, and each set of bosses 18—18$^a$ are in alinement with each other. Each boss 18 in the construction shown has a socket therein, whereas each boss 18$^a$ has an opening extending through it, which opening registers with an opening in the adjacent vertical member 11 of the combined platform and frame. Supported in each pair of bosses 18—18ª is a rod 19 which, as clearly shown in Figs. 3 and 5, lies beneath and in contact with the main or body portion of the platform, so as to furnish support therefor. These rods are inserted in place by passing them through the openings in the member 11 of the platform, and through the bosses 18ª and into the sockets in the bosses 18, and are each held secured by a set screw 19ª that passes through the side of the boss 18ª, as clearly shown in Fig. 5—in which figure the rod 19 there shown is indicated as extending through its boss 18ª, and projecting slightly beyond the adjacent down-turned member 11 of the platform. Of course, if desired, the boss 18, instead of being merely provided with a socket as described, might have an opening through it as in the case of the boss 18ª—so that the rod 19 may be inserted from either side of the truck, but I prefer the construction shown and described. Two other similar rods 20 are employed for giving support to the central portion of the platform, and these rods 20 are secured in place in the same manner as the rods 19, and when in place will, like such rods 19, lie immediately under and against the horizontal portion of the metal plate 10 that forms the rod-receiving portion of the platform. To support these intermediate rods 20 I rivet to the inner face of each of the downwardly-extending members 11 of the platform two heavy plates 21, each of which is provided with bosses 22 that correspond to the bosses 18, and bosses 22ª that correspond to the bosses 18ª. Through each of the bosses 22ª is a set screw 23 that acts to hold the rods 20 against accidental removal.

At each side of the truck at its forward portion is a semi-elliptic spring 24, the upper leaf of each of which at its front end is turned around the front rod 19, and at its rear end surrounds the forward one of the rods 20, the connection of such spring to said rod 20 being by means of a wide loop in the spring, as shown in Fig. 2, so as to allow of the necessary play on such rod as the spring is compressed under loads imposed upon the truck. A similar pair of springs 25 is arranged under the rear portion of the platform, and connected in like manner with the rear one of the rods 19 and the other rod 20. 26 indicates a cross-bar— preferably an angle iron as shown—which extends transversely of the truck, and is firmly secured against the under surface of the pair of semi-elliptic springs 24, being secured to such springs by U-bolts 27, as shown, or in any other suitable manner. At opposite sides of the longitudinal center of the truck and adjacent its forward end are two caster wheels, each indicated by 28, each of said caster wheels being mounted in a yoke 29, the stem of which extends up into and is rotatably mounted in a bracket 30 that has a rearwardly-extending arm 31 that overlies and rests upon the cross-bar 26 and is secured by bolts, or otherwise, to such cross-bar. These caster wheels are of ordinary construction, and while the details of the anti-friction bearings and the means for mounting the wheels in their yokes are shown in detail in Fig. 4, it is not deemed necessary to describe such details, as my invention is not concerned therewith, but, so far as these wheels themselves are concerned, relates to the manner of their connection with the semi-elliptic springs 24 as already described.

The rear supporting wheels are indicated by 32, and are mounted upon an axle 33 lying beneath the central portions of the rear pair of springs 25, which axle is connected directly with such springs through standards 34 that are clamped to the springs, respectively, by U-bolts 35 that pass through plates formed at the upper ends of the standards.

The upward inclinations along the sides of the truck platform that form what I have herein termed the ribs 13, are of importance, in that they so accommodate the various bosses that receive the supporting rods 19 and 20 as to permit such rods to lie directly against the under face of the platform, and thus furnish the requisite support to keep such platform from becoming distorted under the weights imposed upon the truck. Furthermore, there is thus provided sufficient space to receive the ends of the several elliptic springs, and, while allowing perfect freedom of movement of such springs in their usual manner, such springs are restrained from any tendency to shift from proper position. From the description given of the manner of inserting the various rods 19 and 20 into supporting position, and securing them, it will be apparent that when necessary to disconnect the parts for repairs or any other purpose, such operation can be performed very quickly, inasmuch as all that is necessary is the removal of the various set screws that are employed at one side of the truck to lock the rods 19 and 20 in place, and thereafter withdraw such rods through the openings in one of the side members 11 of the combined platform and frame. Such withdrawal of the rods will permit the lifting off of the platform member, and thus permit ready access to the springs and the wheels that are connected therewith.

It is sometimes desirable to employ in connection with trucks of this character upright posts rising from marginal portions of the platform so as to better adapt the truck for carrying certain kinds of articles, and to permit the use of such posts, I form holes 36 in the corner blocks 14, and on the inner faces of the plates 21 are formed lugs with holes 37 therethrough, which latter holes register with holes 38 in the inclined portions 13 of the platform. The truck will be provided at its forward end with any ordinary draft attachment, such, for example, as that indicated at 39.

What I claim as my invention and desire to secure by Letters Patent, is—

1. A truck comprising in combination a sheet-metal platform, a plurality of rods beneath the platform adapted to support the same, means for removably securing such rods in place, a semi-elliptic spring adjacent each side of the truck and extending longitudinally thereof, said springs extending between and connected with two of said supporting rods, and a pair of wheels connected with said springs.

2. A truck comprising in combination a sheet-metal platform having raised portions at opposite sides, a plurality of rods beneath the platform adapted to support the same, supporting means located below said raised portions of the platform for receiving end portions of said rods, a semi-elliptic spring adjacent each side of the truck and extending longitudinally thereof, the ends of said springs extending between and being connected with two of said supporting rods at points beneath said raised portions of the platform, and a pair of wheels connected with said springs.

3. A truck comprising in combination a sheet-metal platform having downwardly-extending side members, rod-supporting means on the inner faces of said side members, rods arranged beneath the platform to receive the weight of the platform and loads imposed thereon, the end portions of said rods engaging said rod-supporting means, a semi-elliptic spring adjacent each side of the truck and extending longitudinally thereof, said springs extending between and being connected with two of said rods, and a pair of wheels connected with said springs.

4. A truck comprising in combination a sheet-metal platform having downwardly-extending side members, rod-supporting means on the inner faces of said side members, rods arranged beneath the platform to receive the weight of the platform and loads imposed thereon, the end portions of said rods engaging said rod-supporting means, a semi-elliptic spring adjacent each side of the truck and extending longitudinally thereof, said springs extending between and being connected with two of said rods, means for detachably connecting said rods with said rod-supporting means, and a pair of wheels connected with said springs.

5. A truck comprising in combination a sheet-metal platform having downwardly-extending side members and raised portions connecting the body portion of the platform with said side members, rod-supporting members on the inner faces of said side members and located beneath said raised portions, rods arranged below the platform to receive the weight thereof and of the loads imposed thereon, the end portions of said rods engaging said rod-supporting means, a semi-elliptic spring adjacent each side of the truck and extending longitudinally thereof and connected with two of said rods at points beneath said raised portions of the platform, and a pair of wheels connected with said springs.

6. A truck comprising in combination a sheet-metal platform having downwardly-extending side members, one of said members having openings therethrough, rod-supporting means carried by the opposite member and in alinement with said openings, rods extending through said openings and into said alined supporting means on the opposite side member, said rods being adapted to bear against the under face of the platform, means for removably locking said rods in place, semi-elliptic springs adjacent the sides of the truck and extending longitudinally thereof, said springs extending between and being connected with two of said rods, and a pair of wheels connected with said springs.

7. A truck comprising in combination a sheet-metal platform having downwardly-extending side and end members, blocks at the corners of the platform connecting said side and end members together, a plate attached to the inner face of each of said side members intermediate of the ends thereof, rod-attaching means carried by each of said blocks and plates, rods extending transversely of the truck and in contact with the under surface of the platform, said rods being in engagement with the said rod-attaching means of the corner blocks and plate, respectively, two pairs of semi-elliptic springs adjacent the forward and rear ends of the trucks, said springs being connected with end portions of certain of said platform-supporting rods, and wheels connected with each pair of springs.

8. A truck comprising in combination a sheet-metal platform having downwardly-extending side and end members, blocks at the corners of the platform connecting said side and end members together, a plate attached to the inner face of each of said side members intermediate of the ends thereof, rod-attaching means carried by each of said blocks and said plates, a rod extending between the said attaching means on the forward corner blocks, another rod extending between the said attaching means on the rear corner blocks, two rods extending between the said attaching means on the intermediate plates, all of said rods being adapted to bear against the under face of the platform, means for removably locking said rods in place, a pair of semi-elliptic springs adjacent the sides of the truck and extending longitudinally thereof, said springs extending between and being connected with the forward rod and one of the intermediate rods, another similar pair of springs connected with the rear rod and the other intermediate rod, and a pair of wheels connected with each of said pairs of springs.

9. A truck comprising in combination a sheet-metal platform having downwardly-extending side and end members, blocks at the corners of the platform connecting said side and end members together, a plate attached to the inner face of each of said side members intermediate of the ends thereof, rod-attaching means carried by each of said blocks and said plates, a rod extending between the said attaching means on the forward corner blocks, another rod extending between the said attaching means on the rear corner blocks, two rods extending between the said attaching means on the intermediate plates, all of said rods being adapted to bear against the under face of the platform, means for removably locking said rods in place, a pair of semi-elliptic springs adjacent the sides of the truck and extending longitudinally thereof, said springs extending between and being connected with the forward rod and one of the intermediate rods, another similar pair of springs connected with the rear rod and the other intermediate rod, a bar connected with the forward pair of springs, a caster-wheel carried by said bar, an axle connected with the rear pair of springs, and a pair of wheels mounted on said axle.

10. A truck comprising in combination a sheet-metal platform having raised portions extending along each side portion thereof and having downwardly-extending members depending from said raised portions, a plurality of rods lying beneath the platform and adapted to support the same, rod-holding means located beneath said raised portions, two semi-elliptic springs adjacent each side of the truck and also located beneath said raised portion, each spring being connected with two of said rods, a bar extending across the truck and connected with the forward pair of springs, a caster-wheel attached to said bar, and a pair of wheels connected with the rear pair of springs.

11. A truck comprising a platform having each of its marginal portions inclined upwardly from its main or body portion and then downwardly turned to provide a substantially-vertical wall member, two semi-elliptic springs alongside of each of said wall members beneath said inclined portions, and a pair of wheels connected with each pair of springs.

12. A truck comprising a platform having raised portions at its sides and members depending from said raised portions, two semi-elliptic springs alongside of each of said depending members beneath said raised portions of the platform, a cross-bar extending between the forward pair of said springs, a caster-wheel connected with said cross-bar, an axle connected with said other pair of springs, and a pair of wheels mounted on said axle.

13. In a truck, the combination with a combined platform and frame comprising a plate having each of its marginal portions inclined upwardly from its main or body portion and then downwardly turned to provide a substantially-vertical wall member, of rods extending across the truck for supporting the main or body portion of such plate, and means carried by the said vertical wall members for engagement by said rods.

ARTHUR G. LEONARD, Jr.